United States Patent [19]

Köck et al.

[11] Patent Number: 5,000,304

[45] Date of Patent: Mar. 19, 1991

[54] CLUTCH DISC

[75] Inventors: Wolfgang Köck, Obbach; Harald Raab, Schweinfurt; Karl H. Dotter, Dittelbrunn; Norbert Ament, Werneck, all of Fed. Rep. of Germany

[73] Assignee: Fichtel & Sachs AG, Schweinfurt, Fed. Rep. of Germany

[21] Appl. No.: 280,983

[22] Filed: Dec. 7, 1988

[30] Foreign Application Priority Data

Dec. 18, 1987 [DE] Fed. Rep. of Germany ....... 3743075

[51] Int. Cl.⁵ .............................................. F16D 3/14
[52] U.S. Cl. .............................. 192/106.2; 192/70.17; 464/68
[58] Field of Search .............. 192/106.1, 106.2, 110 B, 192/70.17; 464/66, 68

[56] References Cited

U.S. PATENT DOCUMENTS

| | | | |
|---|---|---|---|
| 4,465,172 | 8/1984 | Gatewood | 192/106.2 |
| 4,494,642 | 1/1985 | Hashimoto | 192/106.2 |
| 4,562,913 | 1/1988 | Cucinotta et al. | 192/106.2 |
| 4,606,451 | 8/1988 | Martinez-Corral et al. | 192/106.2 |
| 4,650,053 | 3/1987 | Kayanoki et al. | 192/106.2 |
| 4,663,983 | 5/1987 | Kobayashi et al. | 192/106.2 |
| 4,732,250 | 3/1988 | Maucher et al. | 192/70.17 |
| 4,751,992 | 6/1988 | Maucher et al. | 192/70.17 X |
| 4,782,933 | 11/1988 | Jackel et al. | 192/106.2 X |
| 4,788,884 | 12/1988 | Rein et al. | 192/106.2 X |
| 4,813,295 | 3/1989 | Drexl et al. | 192/106.2 X |
| 4,815,006 | 3/1989 | Friedmann | 192/106.2 X |

FOREIGN PATENT DOCUMENTS

| | | |
|---|---|---|
| 0223442 | 5/1987 | European Pat. Off. |
| 3500920 | 7/1986 | Fed. Rep. of Germany |
| 3544500 | 6/1987 | Fed. Rep. of Germany |
| 2540583 | 8/1984 | France |
| 2544426 | 10/1984 | France |
| 143820 | 11/1981 | Japan |
| 2184203 | 6/1987 | United Kingdom |

*Primary Examiner*—Randolph A. Reese
*Assistant Examiner*—John A. Ricci
*Attorney, Agent, or Firm*—Toren, McGeady & Associates

[57] ABSTRACT

The clutch disc for a motor vehicle friction clutch comprises a hub on which a driving disc provided with friction linings is coaxially rotatably mounted through a torsional vibration damper. The torsional vibration damper has two mutually relatively rotatable damper parts which are rotationally elastically coupled with one another through springs. One of the damper parts is guided rotatably on the hub through at least one rolling bearing. The rolling bearing reduces especially the friction occuring in idling operation.

6 Claims, 5 Drawing Sheets

CLUTCH DISC

BACKGROUND OF THE INVENTION

The invention relates to a clutch disc for a motor vehicle friction clutch.

A clutch disc for a motor vehicle friction clutch is known from DE-A-3,544,500 in which a driving disc provided with friction clutch linings is mounted for rotation through a limited angle of rotation on a hub by means of a torsional vibration damper. The torsional vibration damper has two damper parts rotatable in relation to one another about the axis of rotation of the hub, which are rotationally elastically coupled with one another through several damper springs. The damper part which carries the driving disc is mounted on the hub through a synthetic plastics material bearing ring. Such a mounting is however frequently not adequate for high stressing.

The invention is directed to a clutch disc which renders a bearing mounting possible which is as free as possible from play, with the most constant and low friction forces possible even when high radial forces are acting between the driving disc and the hub.

SUMMARY OF THE INVENTION

Within the scope of the invention the two damper parts are mounted on one another through at least one rolling bearing. The unavoidable basic friction of the clutch disc is thus determined by rolling friction which is substantially less, especially under high load, than the sliding friction of conventional bearing rings. Furthermore even under high load the wear of the bearing point can be kept substantially lower. The constant, very low friction level can be deliberately raised by additional friction devices to friction values which as before are still likewise low, which is advantageous especially for the damping of torsional vibrations occurring in idling operation. If the clutch disc comprises a torsional vibration damper dimensioned for operation under load and a torsional vibration damper dimensioned for idling operation, the rolling bearings are preferably arranged so that they mount those components which rotate in relation to one another in idling operation on one another, since specifically here the very low and constant friction force of the rolling bearings is advantageous.

The torsional vibration damper of the clutch disc can be of conventional construction and comprise for example two first disc parts arranged with axial spacing from one another and a second disc part arranged between the two first disc parts and rotationally elastically coupled with the first disc parts through the damping springs. The two second disc parts carry the driving disc provided with the clutch friction linings and are preferably each individually mounted by means of a rolling bearing each on the hub. Especially if the first disc parts are produced from sheet metal the vibration damper can be produced at especially favourable cost if the races of the rolling bearings are formed for the one part directly on the hub and for the other part directly into the sheet metal material of the first disc parts. In this way additional bearing shells can be eliminated. The two rolling bearings can advantageously be formed as oblique ball bearings. If the momentary axes of rotation of the balls of these oblique ball bearings intersect the axis of rotation of the hub at a spacing from one another which is greater than the axial spacing of the oblique ball bearings from one another, the two oblique ball bearings can also be exploited for the axial fixing of the torsional vibration damper on the hub. The bearing system can be kept free from play over the entire operating range by axial initial stressing of the first disc parts consisting of sheet metal.

Especially in the case of configurations in which the second disc part is axially movably connected with the hub it can advantageously be provided that one of the two rolling bearings is formed as an axially fixed bearing and the other as an axially free bearing. In this way both the first and the two second disc parts can be aligned in relation to one another automatically. The fixed bearing which fixes the first disc parts axially in relation to the hub is preferably formed as a grooved ball bearing. The free bearing can be a needle or roller bearing. The invention can however also be used in configurations of clutch discs where the two first disc parts are axially fixed on the hub through components of friction devices. In the case of these configurations both rolling bearings can be formed as axially free bearings.

The embodiments of the invention as explained above, in which the two first disc parts are mounted on the hub directly through a rolling bearing each, are especially suitable for clutch discs where both a friction device dimensioned for operation under load and a friction device dimensioned for idling operation are arranged axially between the two first disc parts. In forms of embodiment where the torsional vibration damper dimensioned for idling operation is arranged axially outside the two first disc parts, that is axially laterally of the vibration damper dimensioned for operation under load, the hub frequently consists of an inner hub and an outer hub arranged concentrically therewith and coupled through a splining with play in rotation with a counter-splining of the inner hub. The play in rotation determines the working range of the idling torsional vibration damper acting between the outer hub and the inner hub. In these forms of embodiment the two rolling bearings are expediently arranged between the outer hub and the inner hub. Here again the rolling bearings can be formed as oppositely inclined oblique ball bearings which fix the outer hub on the inner hub in both axial directions. However it is also possible here to make one of the rolling bearings as fixed bearing and the other as free bearing.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail below by reference to a drawing, wherein.

DESCRIPTION OF PREFERRED EMBODIMENTS

Figures 1, 2:
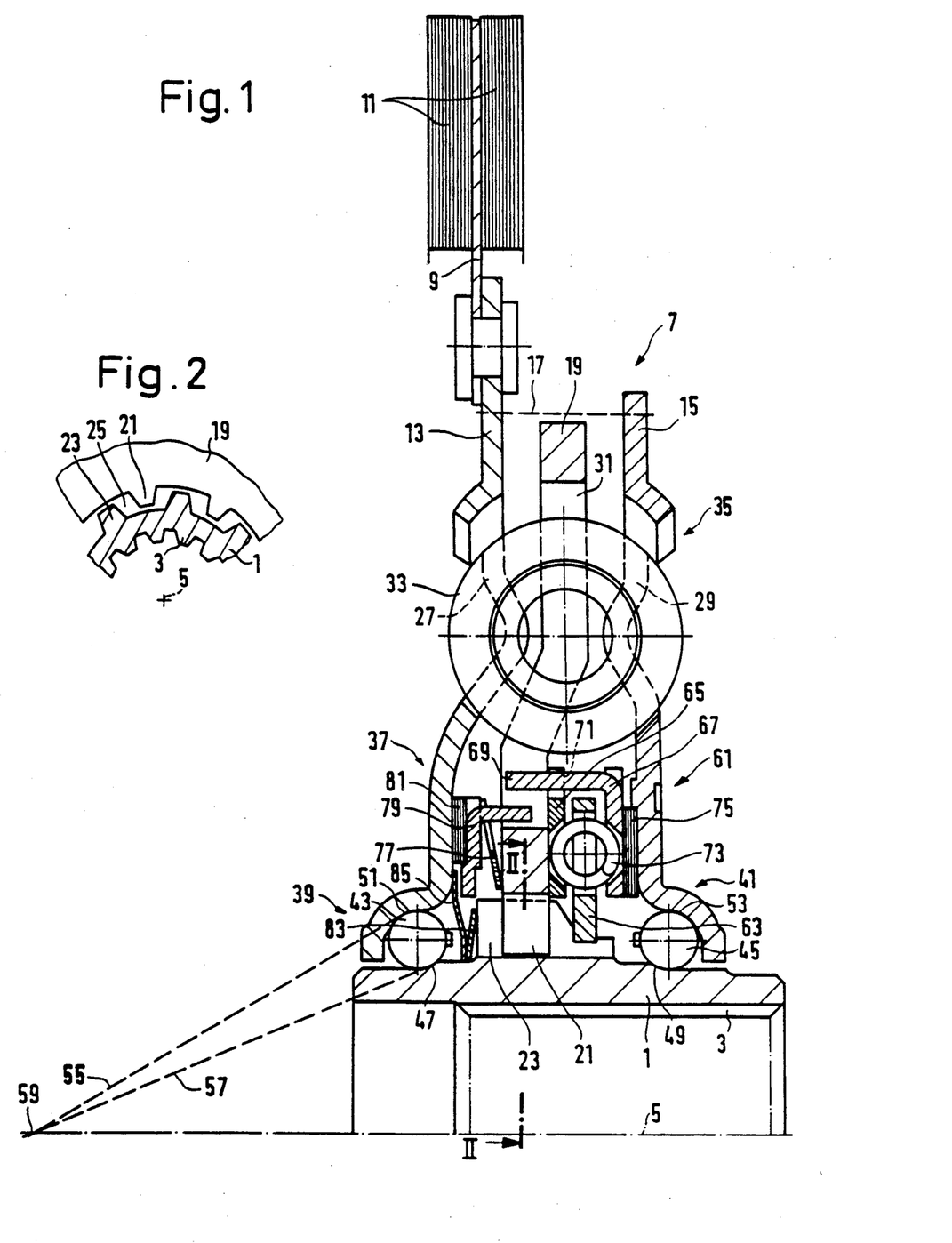
FIG. 1 shows an axial longitudinal section through the upper half of a clutch disc with a torsional vibration damper the side discs of which are mounted on a hub through oblique ball bearings.
FIG. 2 shows a detail section through the clutch disc, seen along a line II—II in FIG. 1.

The clutch disc as represented in FIGS. 1 and 2 comprises a hub 1 which is couplable through an internal splining 3 in the usual way with a gear input shaft rotatable about the axis 5 of rotation. A driving disc 9 is mounted rotatably through a limited angle of rotation on the hub 1 through a torsional vibration damper designated in general by 7, and is provided in the usual way with clutch friction linings 11 axially on both sides. The torsional vibration damper 7 comprises two first disc parts in the form of second discs 13, 15 produced from sheet metal, which are connected firmly into a unit through a plurality of distance rivets or the like with axial spacing from one another, which are indicated at 17. A second disc part in the form of a hub disc 19 is arranged axially between the side discs 13, 15 and has on its internal circumference a splining 21 which engages in a counter-splining 23 of the hub 1 and couples the hub disc 19 axially movably and non-rotatably, except for a rotational play 25 (FIG. 2), with the hub 1. Springs 33 which couple the side discs 13, 15 rotationally elastically with the hub disc 19 are seated in mutually axially aligned windows 27, 29 and 31 of the side discs 13, 15 and of the hub disc 19 respectively. The springs, of which FIG. 1 shows only one, are arranged offset in relation to one another in the circumferential direction and form a torsional vibration damper 35 dimensioned for operation under load, the friction device 37 of which, which is dimensioned for operation under load, will be explained in greater detail hereinafter.

The torsional vibration damper 7 is guided both axially and radially on the hub 1 by two oblique ball bearings 39, 41. The oblique ball bearings 39, 41 have balls 43, 45 which run directly, that is without additional bearing shells, on inner races 47, 49 of the hub 1 for the one part and outer races 51, 53 formed into the sheet metal material of the two discs 13, 15. As represented by the example of the oblique ball bearing 39, the momentary axes 55, 57 of rotation, about which the balls 43, 45 rotate in the races, intersect the axis 5 of rotation of the hub 1 at an intersection point 59 which lies on the side remote from the other oblique ball bearing in each case. Thus the distance of the two intersection points from one another is greater than the axial distance of the two oblique ball bearings 39, 41 from one another. The side discs 13, 15, connected with one another by the distance rivets 17, are elastically initially stressed axially towards one another and ensure a constantly play-free bearing mounting of the driving disc 9 on the hub 1. The bearing mounting is capable of high loading and can be used even with a relatively great axial offset between input and output parts of the clutch.

The oblique ball bearings 39, 41 furthermore guarantee a very low basic friction between the hub 1 and the driving disc 9, whereby even in idling operation with very small relative angles of rotation it is possible to maintain a constant, very low friction.

For the damping of torsional vibrations in idling operation an idling torsional vibration damper 61 is provided. The idling torsional vibration damper 61 comprises a hub disc 63 secured on the hub 1 in the region of the splining 23 and two side discs 65, 67 arranged axially on both sides of the hub disc 63. The side disc 67 placed remote from the hub disc 19 has several axially bent-off lugs 69 on its external circumference, by means of which it is coupled non-rotatably both with the side disc 65 and with the hub disc 19. The axial spacing of the side discs 65, 67 is fixed by shoulders 71 of the lugs 69. Springs 73 dimensioned for idling operation, which couple the hub disc 63 rotationally elastically with the two side discs 65, 67 and thus the hub disc 19, are seated in windows aligned axially in relation to one another of the side discs 65, 67 and the hub disc 63. The idling torsional vibration damper 61 is effective within the play 25 in rotation between the splinings 21, 23. After this rotational play is taken up the idling vibration damper 61 is bridged over and the under-load torsional vibration damper 35 exclusively is effective.

The under-load friction device 37 damps torsional vibrations occurring in the under-load range and fixes the hub disc 19 axially in relation to the side discs 13, 15. The friction device 37 comprises a friction ring 75 between the side disc 15 and the side disc 67 and an axially acting dished spring 77 between the hub disc 19 and a thrust disc 79 guided non-rotatably but axially movably on the hub disc 19. A further friction ring 81 is arranged axially between the thrust disc 79 and the side disc 13. The dished spring 77 bears through the hub disc 19, the side disc 65, the lug 69, the side disc 67 and the friction ring 75 on the side disc 15 for the one part and through the thrust disc 79 and the friction ring 81 on the side disc 13 for the other part. Since the hub disc 19 and the side discs 65, 67 are axially movable in relation to the hub 1, they can align themselves in relation to the side discs 13, 15 which are axially fixed on the hub 1.

Since the basic friction of the two oblique ball bearings 39, 41 is very slight, an idling friction device is also associated with the idling vibration damper 61. The idling friction device is effective directly between the hub 1 and the side disc 13 and comprises an axially acting dished spring 83 which is supported axially through a support ring on the side disc 13 for the one part and on an axial flank of the splining 23 for the other part. The support ring 85 is arranged radially within the friction ring 81 and ensures a selectable value of the idling friction independent of the bearing mounting.

Variants of clutch discs similar to FIG. 1 will be described hereinafter. Parts of like effect are designated with the reference numerals of FIG. 1 and provided with a letter for distinction. For further explanation reference is made to the description of FIGS. 1 and 2. The components 9, 11, 17 and 25 are not illustrated, for the sake of simplicity, although present.

Figure 3:
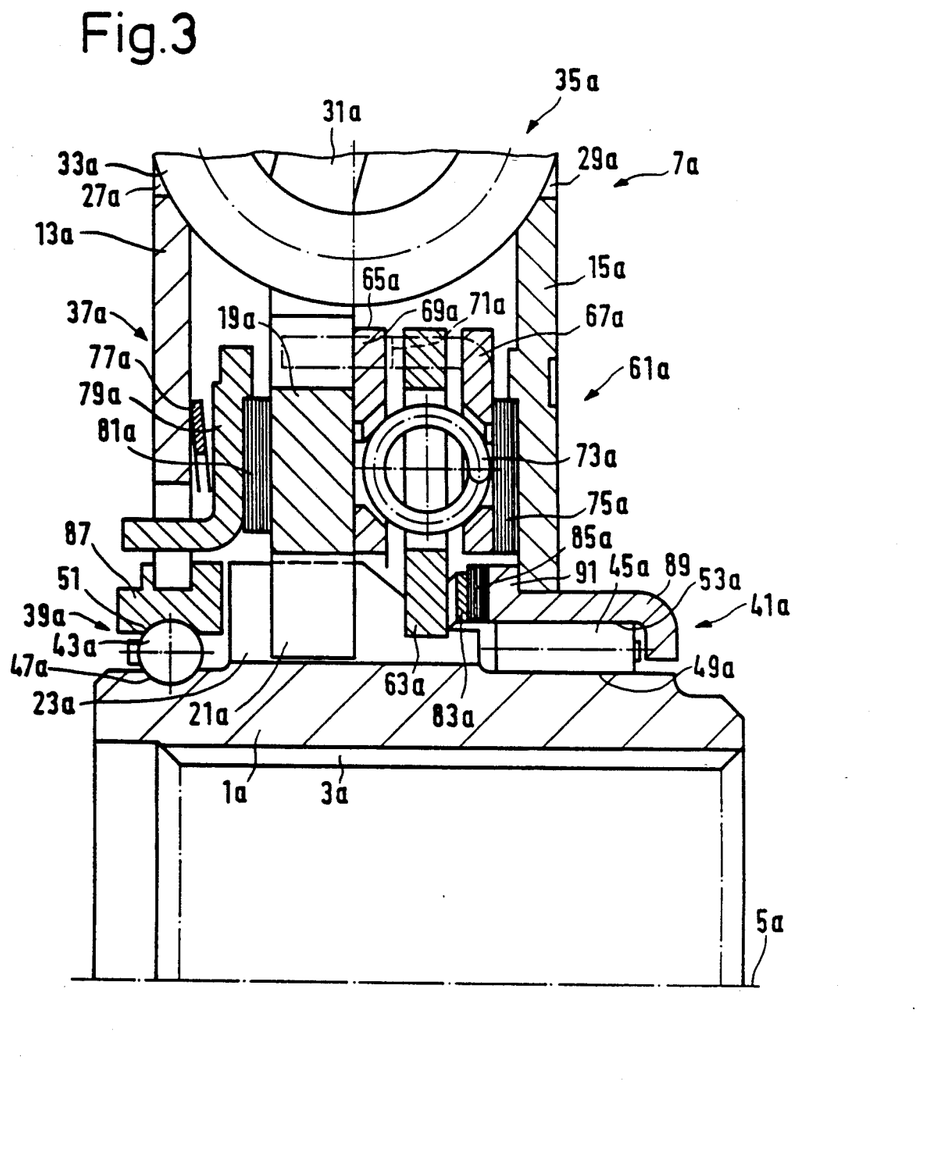
FIG. 3 shows a partial axial longitudinal section through a variant of a clutch disc similar to that in FIG. 1, with a fixed bearing and a free bearing.

The clutch disc according to FIG. 3 differs from the clutch disc according to FIG. 1 in the nature of its rolling bearings 39a and 41a, by means of which the side discs 13a, 15a are mounted on the hub. The rolling bearing 39a is formed as an axially fixed grooved ball bearing, the balls 43a of which run in a groove race 47a provided directly on the external circumference of the hub 1a. The outer race 51a is provided in a bearing shell 87 which is secured, for example by peening over, on the internal circumference of the side disc 13a. The rolling bearing 41a of the opposite side disc 15a is formed as an axially free needle bearing and can transmit no axial forces to the hub 1a. The needle bearing 41a has rollers 45a running directly on the external circumference of the hub 1a, which are supported on an outer track 53a of a bearing shell 89 inserted into the side disc 15a.

The under-load friction device 37a differs from the friction device 37 according to FIG. 1 merely in the manner of installation of its components. The friction ring 81a is seated axially between the thrust ring 79a, which is guided non-rotatably on the side disc 13a, and the hub disc 19a, while the dished spring 77a is arranged axially between the thrust ring 79a and the side disc 13a. The idling friction device is installed on the side of the idling damper 61a between its hub disc 63a and an annular flange 91 of the bearing shell 89. It comprises a corrugated spring 83a which is supported through a friction ring 85a on the annular flange 91 for the one part and on the hub disc 63a for the other part. The bearings of the side disc 15a are made fast in relation to the hub 1a by the distance rivets (not illustrated further) and the grooved ball bearing which fixes the side disc 13a. The hub disc 19a again, like the side discs 65a, 67a too, is axially displaceable in relation to the hub, so that the supporting of the dished spring 77a can take place through the friction rings 75a and 81a upon the side disc 15a. Otherwise the clutch disc according to FIG. 3 corresponds to the clutch disc according to FIG. 1. More especially the very low rolling friction of the rolling bearings 39a and 41a permits of attuning the friction force of the idling friction device exactly to desired values. In certain cases the idling friction device can also be eliminated.

Figure 4:
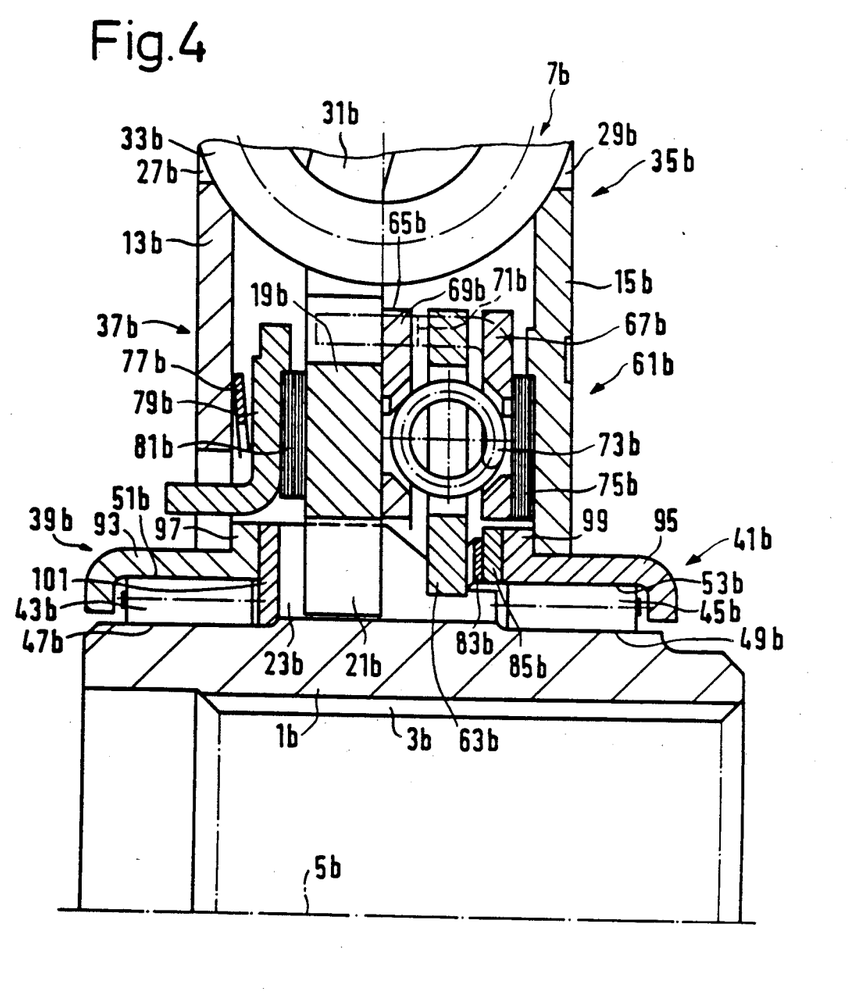
FIG. 4 shows a partial axial longitudinal section through a further variant of a clutch disc similar to that in FIG. 1, with two free bearings.

The clutch disc according to FIG. 4 differs from the clutch disc according to FIG. 3 essentially in that both rolling bearings of the side discs 13b and 15b are formed as axially free needle bearings 39b and 41b. The rollers 43b and 45b of the two needle bearings 39b and 41b run directly on races 47b, 49b of the hub 1b for the one part and on races 51b, 53b of bearing shells 93, 95, which engage each with an annular flange 97, 99 behind the side discs 13b, 15b on the side adjacent to the hub disc 19b. Since the needle bearings 39b, 41b can take up no axial forces the vibration damper as a whole is guided on the hub disc 63b of the idling vibration damper 61b, which hub disc is axially fixedly fitted on the hub 1. The under-load friction device 37b corresponds to the under-load friction device 37a in FIG. 3. Likewise the idling friction device comprises, axially between the hub disc 63b and the annular flange 99, a corrugated spring 83b which bears on the hub disc 63b for one part and, through a friction ring 85b, on the annular flange 99. For the axial fixing of the side discs 13b, 15b in relation to the hub 1b a further friction ring 101 is arranged between the annular flange 97 and the adjacent end of the splining 23b. The corrugated spring 83b is utilised, in the configuration according to FIG. 4, for the axial fixing of the entire damper device 7b.

Figure 5:
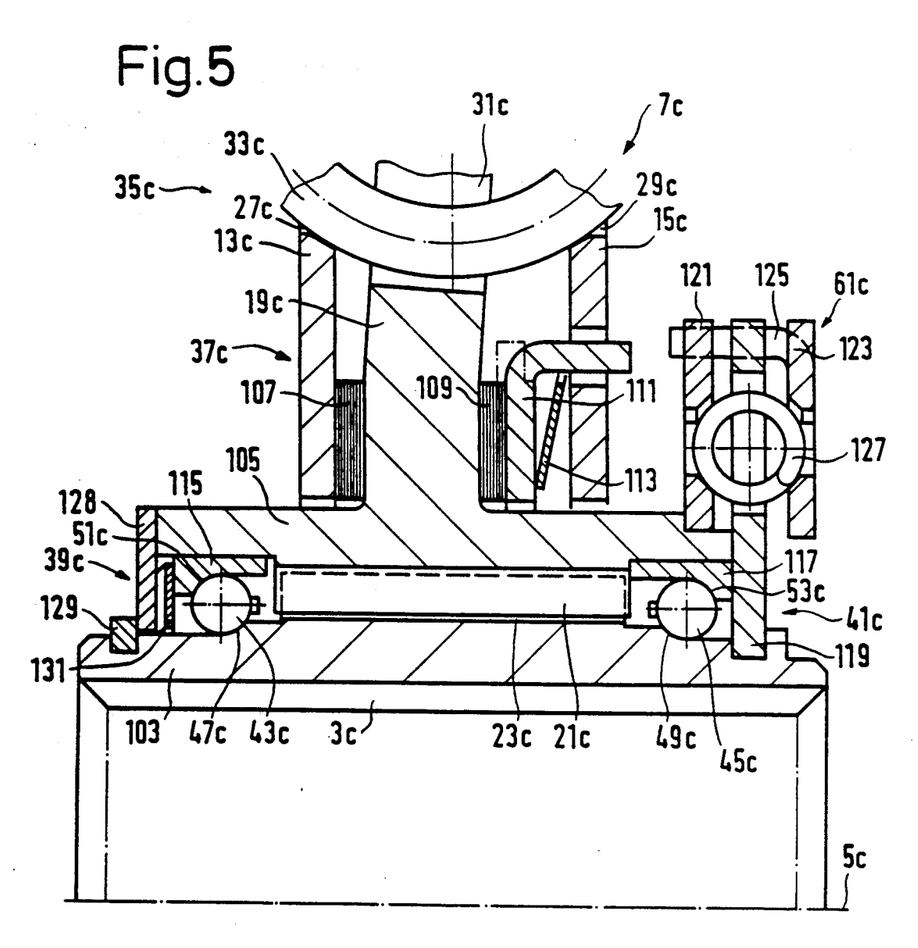
FIG. 5 shows a partial axial longitudinal section through a clutch disc with an outer hub mounted through two oblique ball bearings on an inner hub and FIG. 6 shows a partial axial longitudinal section through a variant of the clutch disc according to FIG. 5 with a fixed bearing and a free bearing.

FIG. 5 shows another configuration of a clutch disc which differs from the clutch discs as explained above primarily in that the hub is divided into an inner hub and an outer hub 105 rotatable coaxially therewith. The inner hub 103 is provided with the internal splining 3c for the coupling with the gear input shaft, which is rotatable about the rotation axis 5c. The outer hub 105 has a splining 21c which engages in a counter-splining 23c of the inner hub 103 and couples the outer hub 105 non-rotatably but with predetermined play in rotation. The play in rotation, just as in the clutch disc according to FIG. 1, fixes the working range of a torsional vibration damper 61c dimensioned for idling operation.

The outer hub 105 is connected in one piece with the hub disc 19c, and axially on both sides of the hub disc 19c there are again arranged side discs 13c, 15c, which are rotationally elastically coupled with the hub disc 19c through springs 33c dimensioned for the under-load range and carry the driving discs (not illustrated further) provided with friction linings. The springs 33c are again situated in axially aligned windows 27c, 29c and 31c of the side discs 13c, 15c and the hub disc 19c respectively. The side discs 13c, 15c, which are firmly connected with one another through distance rivets (not shown) are rotatably mounted directly on the external circumference of the outer hub 105.

The under-load friction device 37c comprises a friction ring 107 axially between the side disc 13c and the hub disc 19c, a friction ring 109 axially between the hub disc 19c and the side disc 15c, a thrust ring 111 guided non-rotatably but axially movably on the side disc 15c, between the friction ring 109 and the side disc 15c and an axially acting dished spring 113 between the thrust ring 111 and the side disc 15c. The dished spring 113 not only generates the friction force of the under-load friction device 37c, but also, through the friction ring 107, fixes the side discs 13c, 15c of the under-load vibration damper 35c in relation to the hub disc 19c.

The outer hub 105 is guided both axially and radially on the inner hub 103, axially on both sides of the hub disc 19c, by oblique ball bearings 39c, 41c. The balls 43c, 45c run directly on races 47c, 49c on the external circumference of the inner hub 103, while bearing shells 115 and 117, the races 51c, 53c of which guide the balls 43c, 45c, are inserted into the outer hub 105. The races 47c, 49c for the one part and 51c, 53c for the other part are again so placed that the momentary axes of rotation of the balls 43c, 45 c intersect the axis 5c of rotation on the side remote from the other oblique ball bearing in each case. The distance between the points of intersection of the momentary axes of rotation is thus, similarly to FIG. 1, greater than the axial distance of the oblique ball bearings 43c, 45c from one another. In the assembly of the outer hub 105 and the inner hub 103 the bearing shells 115, 117 are pressed into the outer hub.

The idling vibration damper 61c is effective between the outer hub 105 and the inner hub 103 within the rotational play of the splinings 21c, 23c and comprises a hub disc 119 secured, for example by peening-over, on the inner hub 103, and two side discs 121, 123 arranged axially on both sides of the hub disc 119. The side disc 121 is secured to the outer hub 105, while the side disc 123 is held by axially bent-over lugs 125 on the side disc 121. Springs 127, which are guided in axially mutually aligned windows of the side discs 121, 123 and of the hub disc 119, couple the side discs 121, 123 rotationally elastically with the hub disc 119.

With the idling vibration damper 61c there is associated an idling friction device. This comprises a support disc 128.

on the side of the outer hub 105 axially remote from the idling vibration damper 61c, which bears axially on a securing ring 129 of the inner hub 103. Between the support disc 128 and the outer race 115 of the oblique ball bearing 39c there is clamped an axially acting corrugated spring 131 which generates a friction moment on relative rotation of the race 115 in relation to the support disc 128. The two oblique ball bearings 39c, 41c have slight play in the axial direction, so that the corrugated spring 131 presses the outer race 117 of the oblique ball bearing 45c into frictional contact with the hub disc 119. The abutment contact between the outer race 117 and the hub disc 119 can also be utilised to take up counter-abutment forces in the pressing-in of the bearing races 115, 117. It is self-evident that the abutment contact of the race 117 on the hub 119 may also be omitted in certain cases.

In the case of the clutch disc according to FIG. 5 use is made of a rolling bearing mounting only in the region of the components which are rotatable in relation to one another in idling operation. In operation under load, in which the splinings 21c, 23c are in abutment with one another, only the side discs 13c, 15c are rotated in relation to the hub disc 19c. The side discs 13c, 15c are mounted rotatably on the outer hub 105 through plain bearings, which however is tolerable in view of the comparatively great friction forces of the friction device 37c occurring in operation under load.

Figure 6:
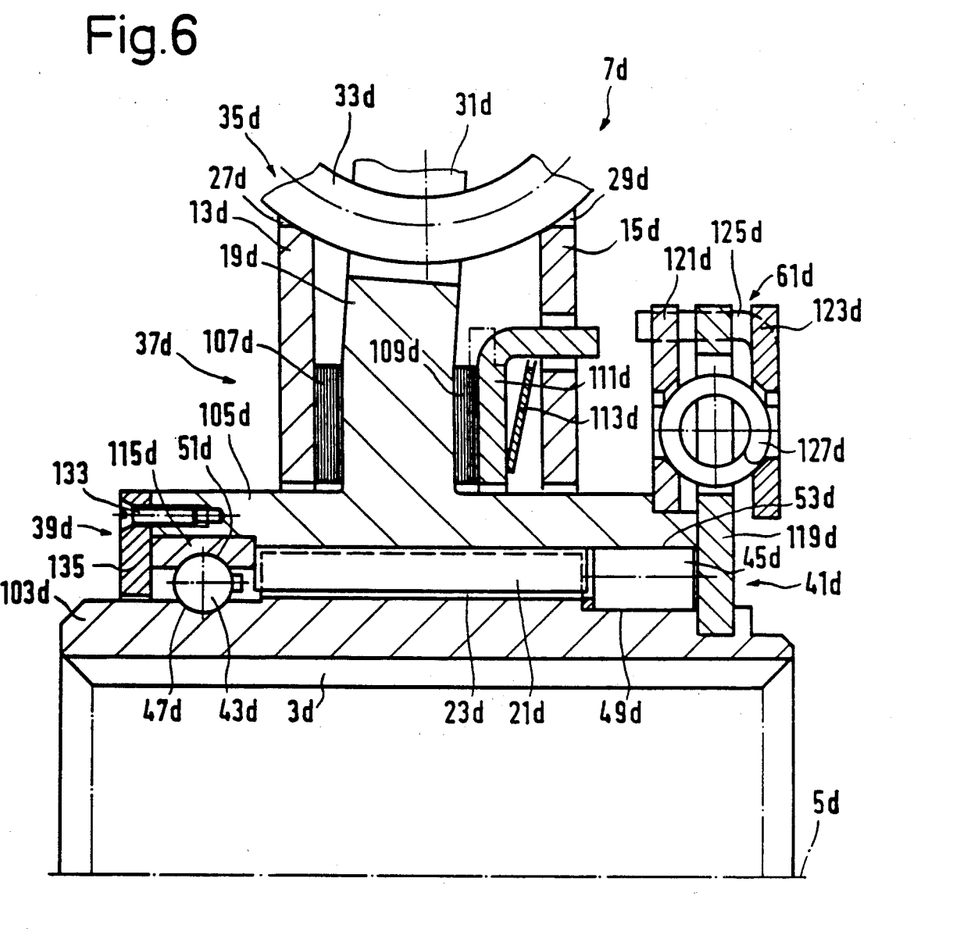

FIG. 6 shows a variant of the clutch disc according to FIG. 5, which differs from this clutch disc only in the nature of its rolling bearings 39d, 41d. Parts of equivalent effect to the clutch disc according to FIG. 5 are designated with the reference numerals according to FIG. 5 and additionally with the letter d. For explanation reference is made, in addition to the description of FIG. 1, to the description of FIG. 5 as well.

While the rolling bearing axially adjacent to the idling torsional vibration damper 61d is formed as an axially free needle bearing, the rolling bearing 39d which carries the outer hub 105d on the axially opposite side on the inner hub 103d is formed as an axially fixed grooved ball bearing. The balls 43d and rollers 45d again run in races 47d, 49d formed directly on the outer surface of the inner hub 103d. While the outer race 53d of the needle bearing 45d is formed directly by the inner circumferential surface of the outer hub 105d, the outer race 51d of the grooved ball bearing 39d is provided in a bearing shell 115d inserted into the outer hub 105d. The bearing shell 115d is removably axially fixed by a lid 135 secured with screws 133 on the end of the outer hub 105d.

The clutch disc according to FIG. 6 has no separate idling friction device. However such a friction device can be provided, for example between the hub disc 119d and the outer hub 105d, axial forces occurring here being taken up by the grooved ball bearing 39d. The side discs 13d, 15d of the under-load vibration damper 7d are conventionally mounted on the outer hub through plain bearings.

In the clutch discs according to FIGS. 5 and 6 the side discs of the under-load vibration damper can however likewise be mounted through rolling bearings on the outer hub, as described with reference to FIGS. 1 to 4, in order to render possible a more precise attunement of the under-load friction device and to achieve a longer life of the clutch disc.

While specific embodiments of the invention have been shown and described in detail to illustrate the application of the inventive principles, it will be understood that the invention may be embodied otherwise without departing from such principles.

What we claim is:

1. A clutch disc comprising:
a hub (1, 103);
a driving disc (9) provided with clutch friction linings (11) and rotatable about a common rotation axis (5) in relation to the hub (1, 103); and
a torsional vibration damper (7) damper have two damper parts (13, 15, 19) rotatable in relation to one another about the rotation axis (5), which are rotationally elastically coupled with one another through several damper springs (33) and of which one damper part (13, 15) is coupled with the driving disc (9) and the other is coupled with the hub (1, 103), while (1, 13, 15) of the two damper parts is rotatably guided on the hub (1, 103) through a bearing arrangement, comprising at least one roller bearing (39, 41), one of the two damper parts comprising two first discs parts (13, 15) arranged with axial spacing from one another and connected nonrotatably with one another, and the other of the two damper parts comprising a second disc part (19) arranged axially between the first disc parts (13, 15), which second disc part (19) is rotationally elastically coupled through the damper springs (33) with the first disc parts (13, 15), and the bearing arrangement comprising two rollers bearings arranged on axially opposite sides of the second disc part (19), which bearings carry one (13, 15 or 9) of the two damper parts on the hub (1, 103), said two roller bearings (39, 41) each mount one of the two first disc parts (13, 15) on the hub (1), said two rolling bearings being formed as oblique ball bearings (39, 41; 39c, 41c), the balls (43, 45; 43c, 45c) of the oblique ball bearings rotating about momentary rotation axes (55, 57) which intersect the rotation axis (5, 5c) of the hub (1; 103) on the side axially remote from the other oblique ball bearing in each case.

2. A clutch disc comprising:
a hub (1, 103);
a driving disc (9) provided with clutch friction linings (11) and rotatable about a common rotation axis (5) in relation to the hub (1, 103); and
a torsional vibration damper (7) damper have two damper parts (13, 15, 19) rotatable in relation to one another about the rotation axis (5), which are rotationally elastically coupled with one another through several damper springs (33) and of which one damper part (13, 15) is coupled with the driving disc (9) and the other is coupled with the hub (1, 103), while (1, 13, 15) of the two damper parts is rotatably guided on the hub (1, 103) through a bearing arrangement, comprising at least one roller bearing (39, 41), one of the two damper parts comprising two first discs parts (13, 15) arranged with axial spacing from one another and connected nonrotatably with one another, and the other of the two damper parts comprising a second disc part (19) arranged axially between the first disc parts (13, 15), which second disc part (19) is rotationally elastically coupled through the damper springs (33) with the first disc parts (13, 15), and the bearing arrangement comprising two rollers bearings arranged on axially opposite sides of the second disc part (19), which bearings carry one (13, 15 or 9) of the two damper parts on the hub (1, 103), said two rolling bearings (39, 41) each mounting one of the two first disc parts (13, 15) on the hub (1), the second disc part (19a, b) comprises a splining (21a) by means of which it is coupled axially movably and, except for a predetermined rotational play, non-rotatably with a counter-splining (23a, b) of the hub (1a, b), the second disc part (19a, b) being fixed axially through at least one friction device (37a, b) in relation to the first disc parts (13a, 15a; 13b, 15b), one of the two first disc parts (13a, b) being axially fixed on the hub (1a, b), while the other (15a, b) of the two disc parts is guided on the hub (1a, b) by an axially free rolling bearing (41a, b), said one (13a) of the two disc parts being mounted axially fixedly on the hub (1a) by an axially fixed rolling bearing (39a), the axially fixed rolling bearing being formed as a grooved ball bearing (39a) and the axially free rolling bearing being formed as a needle or roller bearing (41a).

3. A clutch disc comprising:
a hub (1, 103);
a driving disc (9) provided with clutch friction linings (11) and rotatable about a common rotation axis (5) in relation to the hub (1, 103); and
a torsional vibration damper (7) damper have two damper parts (13, 15, 19) rotatable in relation to one another about the rotation axis (5), which are rotationally elastically coupled with one another through several damper springs (33) and of which one damper part (13, 15) is coupled with the driving disc (9) and the other is coupled with the hub (1, 103), while (1, 13, 15) of the two damper parts is rotatably guided on the hub (1, 103) through a bearing arrangement, comprising at least one roller bearing (39, 41), one of the two damper parts comprising two first discs parts (13, 15) arranged with axial spacing from one another and connected non-rotatably with one another, and the other of the two damper parts comprising a second disc part (19) arranged axially between the first disc parts (13, 15), which second disc part (19) is rotationally elastically coupled through the damper springs (33) with the first disc parts (13, 15), and the bearing arrangement comprising two rollers bearings arranged on axially opposite sides of the second disc part (19), which bearings carry one (13, 15 or 9) of the two damper parts on the hub (1, 103), said two rolling bearings (39, 41) each mounting one of the two first disc parts (13, 15) on the hub (1), the first disc parts (13b, 15b) being axially fixed on the second disc part (19b) through a friction device (37b) dimensioned for operation under load, and being axially fixed on the counter splining (23b) of the hub (1b) through a friction device (83b, 85b) dimensioned for idling operation, both rolling bearings being formed as axially free rolling bearings (39b, 41b).

4. A clutch disc comprising:

a hub (1, 103);
a driving disc (9) provided with clutch friction linings (11) and rotatable about a common rotation axis (5) in relation to the hub (1, 103); and
a torsional vibration damper (7) damper have two damper parts (13, 15, 19) rotatable in relation to one another about the rotation axis (5), which are rotationally elastically coupled with one another through several damper springs (33) and of which one damper part (13, 15) is coupled with the driving disc (9) and the other is coupled with the hub (1, 103), while (1, 13, 15) of the two damper parts is rotatably guided on the hub (1, 103) through a bearing arrangement, comprising at least one roller bearing (39, 41), one of the two damper parts comprising two first discs parts (13, 15) arranged with axial spacing from one another and connected non-rotatably with one another, and the other of the two damper parts comprising a second disc part (19) arranged axially between the first disc parts (13, 15), which second disc part (19) is rotationally elastically coupled through the damper springs (33) with the first disc parts (13, 15), and the bearing arrangement comprising two rollers bearings arranged on axially opposite sides of the second disc part (19), which bearings carry one (13, 15 or 9) of the two damper parts on the hub (1, 103), the hub comprising an inner hub (103) and an outer hub (105) rotatably arranged coaxially thereto, which engages with a splining (21c, d) and a counter-splining (23c, d) of the inner hub (103) and is coupled through the splining (21c, d) with predetermined rotational play but otherwise non-rotatable with the inner hub (103), the second disc part (19c, d) being connected fast with the outer hub (105) and being coupled through first damper springs (33c, d) dimensioned for operation under load, rotationally elastically with the second disc parts, (13c, 15c; 13d, 15d), and the two roller bearings (39c, d; 41c, d) being arranged between the outer hub (105) and the inner (103).

5. A clutch disc according to claim 4, wherein the two rolling bearings are formed as oblique ball bearings (39c, 41c), the balls (43c, 45c) of which rotate about momentary axes of rotation which intersect the rotation axis (5c) of the hub (103, 105) at an interval which is greater than the axial distance of the two rolling bearings (39c, 41c) from one another.

6. A clutch disc according to claim 4, wherein one of the two rolling bearings is formed as an axially fixed bearing (39d) and the other of the two bearings is formed as an axially free bearing (41d).

* * * * *